(12) United States Patent
Uehara

(10) Patent No.: US 7,092,478 B2
(45) Date of Patent: Aug. 15, 2006

(54) LOCAL TIMER WHICH IS USED IN WIRELESS LAN

(75) Inventor: Teruaki Uehara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 45 days.

(21) Appl. No.: 10/995,410

(22) Filed: Nov. 24, 2004

(65) Prior Publication Data

US 2005/0226359 A1 Oct. 13, 2005

(30) Foreign Application Priority Data

Apr. 9, 2004 (JP) ............................. 2004/115331

(51) Int. Cl.
*H03K 21/00* (2006.01)
(52) U.S. Cl. .................... 377/20; 377/47; 327/146; 327/151; 455/502; 455/562; 713/400; 713/501; 713/502; 713/503
(58) Field of Classification Search .............. 713/400, 713/501–3; 327/146, 151; 377/20, 47; 455/502, 455/562
See application file for complete search history.

(56) References Cited

U.S. PATENT DOCUMENTS

| | | | | |
|---|---|---|---|---|
| 5,768,627 | A | * | 6/1998 | Jones et al. .................... 710/60 |
| 6,292,062 | B1 | * | 9/2001 | Bourk et al. .................... 331/46 |
| 6,587,958 | B1 | * | 7/2003 | Oshins et al. ............... 713/502 |
| 2004/0203389 | A1 | | 10/2004 | Kojima et al. .............. 455/41.2 |

FOREIGN PATENT DOCUMENTS

JP 2003-318771 11/2003

* cited by examiner

*Primary Examiner*—Tuan T. Lam
(74) *Attorney, Agent, or Firm*—Volentine Francos & Whitt, PLLC

(57) ABSTRACT

A local timer includes a dividing counter which counts a first clock and outputs a reference counting signal divided from the first clock; a timing synchronizing timer which counts a timing synchronizing timer value in synchronization with a reference timer responsive to the reference counting signal; a first buffer which stores a counted value of the dividing counter in synchronization with a second clock, when operation is by the first clock; a second buffer which stores the timing synchronizing timer value in synchronization with the second clock, when operation is by the first clock; a first adder which adds a first or second offset value to the stored value in the first buffer in synchronization with the second clock, when the first clock is suspended; and a second adder which adds a set value to the timing synchronizing timer value responsive to a carry from the first adder.

5 Claims, 6 Drawing Sheets

LOCAL TIMER WHICH IS USED IN WIRELESS LAN

CROSS REFERENCE TO RELATED APPLICATION

A claim of priority under 35 U.S.C. §119 is made to Japanese Patent Application No. 2004-115331, filed Apr. 9, 2004, which is herein incorporated by reference in its entirety for all purposes.

BACKGROUND OF THE INVENTION

1. Field of the Invention

The present invention relates to a local timer which is used in a wireless LAN(Local Area Network).

2. Description of the Related Art

A wireless LAN(Local Area Network) system uses an IEEE 802.11 standard. In an infrastructure mode, a beacon signal is transmitted from an access point. The beacon signal is received in a station. A copy of a TSF(Timing Synchronization Function) timer value is managed in the station based on a time stump field of the beacon signal frame. If the beacon signal is not received normally, the station can achieve a clock synchronization by referring the TSF timer value in the station.

In such a station, a 40-Mhz high-speed clock is generated and supplied to a base band LSI as a reference clock. The station has a power saving mode. In the power saving mode, a power consumption is reduced by suspending the supply of the high-speed clock.

While the high-speed clock is suspended, a suspending time is measured by another low-speed clock. Therefore, the wireless LAN station can reduce power consumption. Such technique is described in Japanese Patent Laid-Open 2003-318771.

In the wireless LAN station which is described above, the TSF timer value which is operated in the high-speed clock should continuously be the same as the TSF time value which is operated in the high-speed clock with interval.

For achieving this operation, a suspending time of the high-speed clock is synchronized with the low-speed clock, and then, the TSF timer value which is operated after restarting is set to the TSF timer.

However, if the suspending time of the high-speed clock is synchronized with the low-speed clock, the high-speed clock is continued untill the next timing of the low-speed clock arrives. Therefore, it is difficult to reduce power consumption. Also, if the TSF timer value which is operated after restarting is set to the TSF timer, the TSF timer value which is set in the TSF timer may not be accurate.

SUMMARY OF THE INVENTION

Accordingly, in one aspect of the present invention, a local time in a station which is used in a wireless LAN with reduced power consumption is provided. The local timer includes a first input circuit which has input thereto a first clock, a dividing counter which counts the clock and outputs a reference counting signal, wherein a cycle of the reference counting signal is divided from the first clock, a timing synchronizing timer which counts a timing synchronizing timer value in synchronization with a reference timer in an access point, in response to the reference counting signal, a second input circuit which has input thereto a second clock, wherein a speed of the second clock is slower than a speed of the first clock, a first buffer which stores a counted value in the first counter in synchronization with the second clock, when the station is operated by the first clock, a second buffer which stores the timing synchronizing timer value in synchronization with the second clock, when the station is operated by the first clock, a first adder which adds a first offset value or a second offset value to the stored value in the first buffer in synchronization with the second clock, when the first clock is suspended, wherein the first offset value and the second offset value is selected by a set ratio, and a second adder which adds a set value to the timing synchronizing timer value in response to a carry from the first adder, wherein the set value is set based on a ratio between the first clock and the second clock. The first buffer sets the counted value to the dividing counter in synchronization with the second clock, after the first clock is restarted. The second buffer sets the counted value to the timing synchronizing timer in synchronizing with the second clock, after the first clock is restarted.

DETAILED DESCRIPTION OF THE PREFERRED EMBODIMENTS

Figure 1:
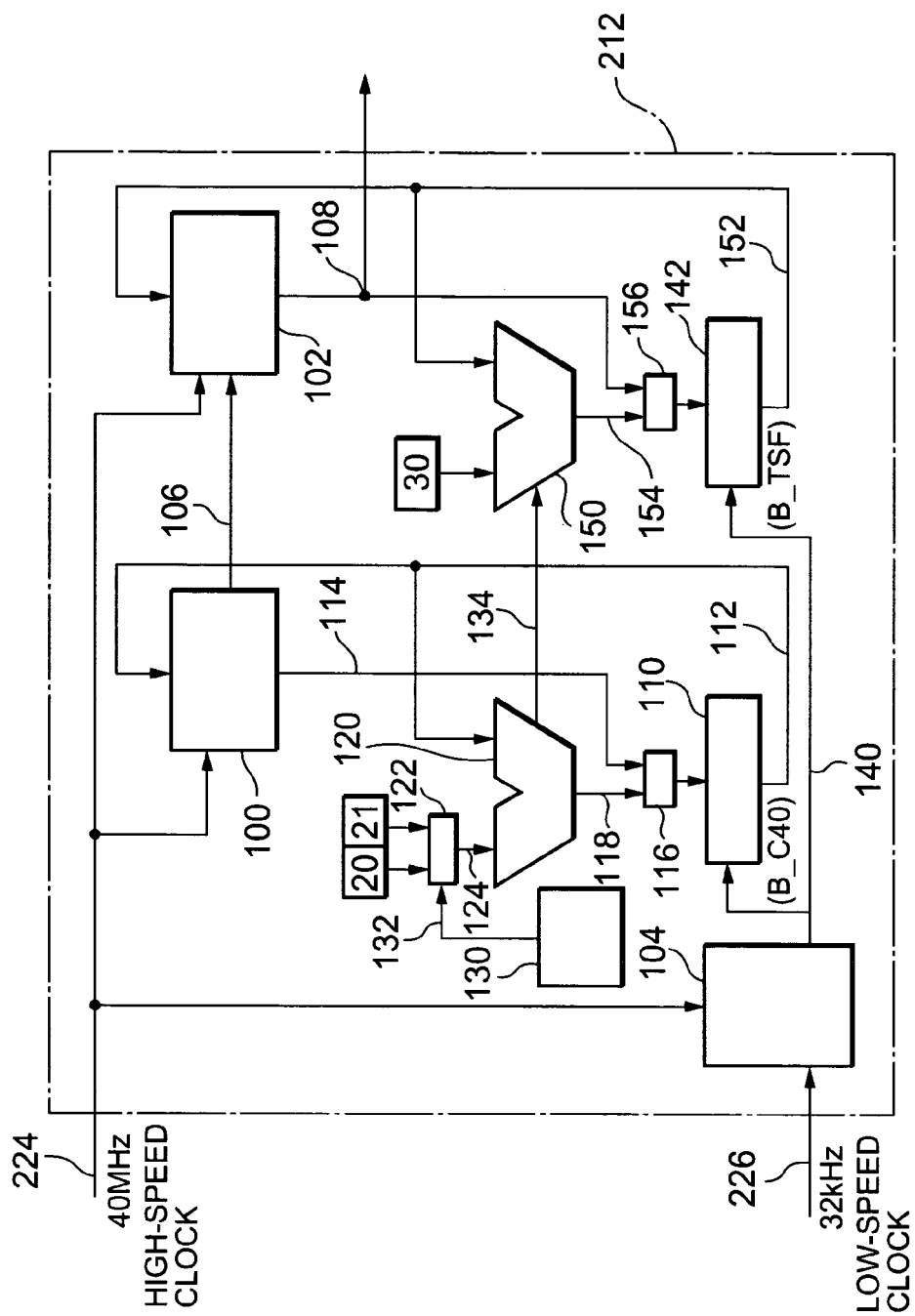
FIG. 1 is a block diagram showing a timer circuit of a present invention.

A local timer which is used in a wireless LAN according to preferred embodiments of the present invention will be explained hereinafter with reference to the accompanying figures. In order to simplify the explanation, like elements are given like or corresponding reference numerals. Dual explanations of the same elements are avoided.

Figure 2:
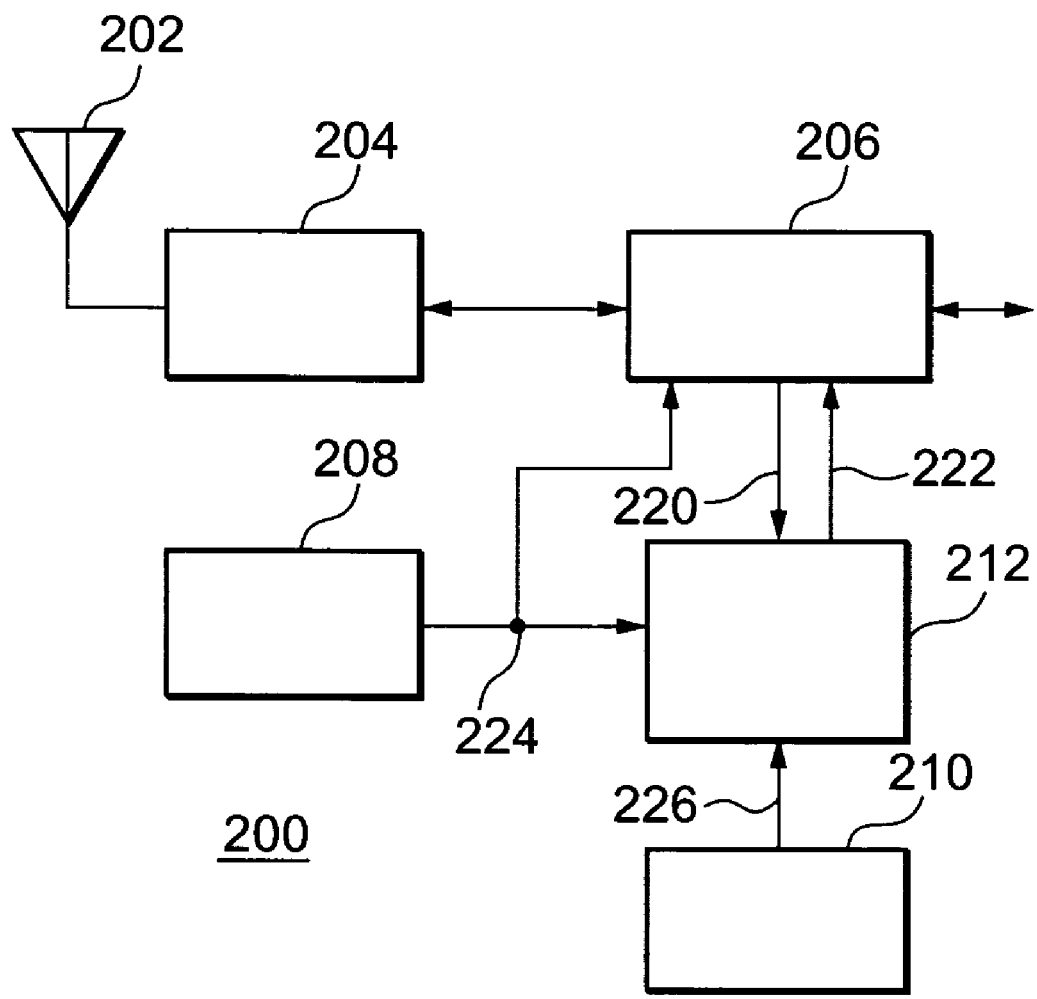
FIG. 2 is a block diagram showing the wireless LAN device of the present invention.

FIG. 2 is a block diagram showing a wireless LAN device 200. The wireless LAN device 200 is compliant with the IEEE 802.11 standard. The wireless LAN device 200 is a station which forms an infrastructure network with an access point (not shown). The station includes a timer circuit which is synchronized with a reference timer which is provided in the access point.

The wireless LAN device 200 includes an RF circuit 204, a base band operation circuit 206 which is connected to the RF circuit 204, a 40-MHz clock generator 208, a 32-kHz clock generator 210, and a timer circuit 212 which is connected to an output terminal of the 40-MHz clock generator 208 and an output terminal of the 32-kHz clock generator 210 and which is connected to baseband operation circuit 206 at 220 and 222. The RF circuit 204 transmits and receives a 2.4-GHz band radio-frequency wave and a 5-GHz band radio-frequency wave via an antenna 202. The base band operation circuit 206 operates a base band signal which is transmitted and received. The 40-MHz clock generator generates a 40-MHz high-speed clock 224 for use as a reference clock in the wireless LAN device. The 32-kHz clock generator 210 generates a 32.768-kHz low-speed clock 226. The timer circuit 212 manages a TSF timer value.

The base band operation circuit 206 extracts the TSF timer value from the receiving signal which is transmitted from the access point, and supplies the extracted TSF timer value to the timer circuit 212 at 220 in FIG. 2. The base band operation circuit 206 is operated by the 40-MHz high-speed clock 224 in a normal operation. An output terminal of the 40-MHz clock generator 208 is connected to the timer circuit 212 and the 40-MHz high speed clock 224 is supplied to the timer circuit 212.

Figure 3:
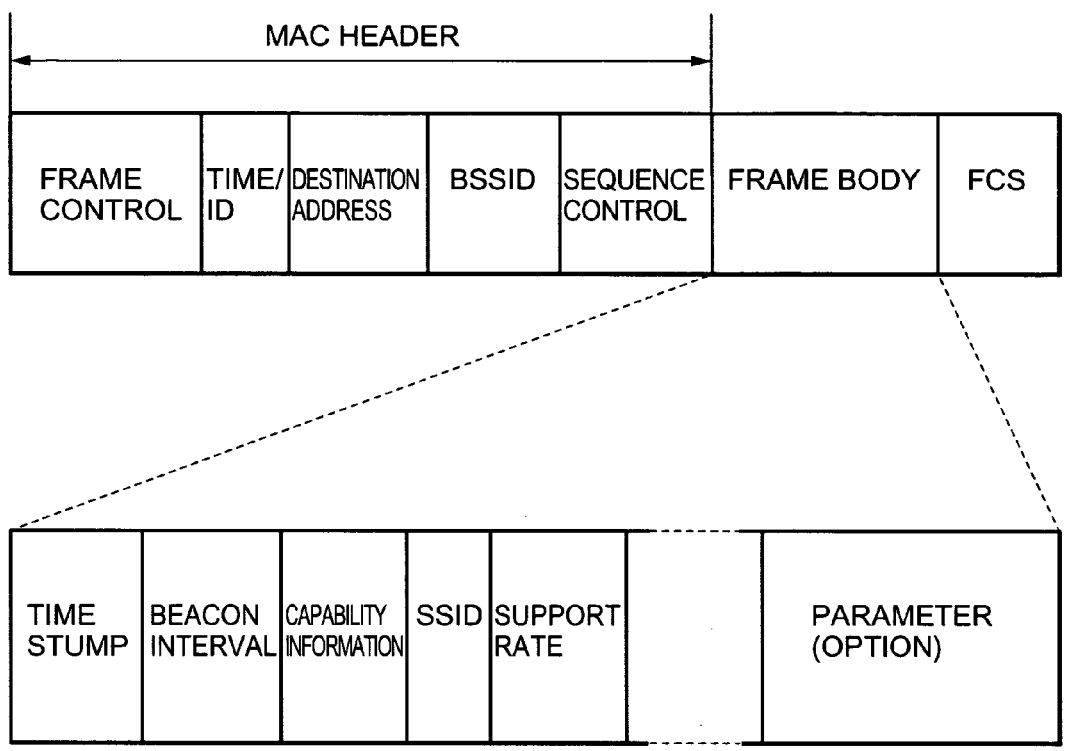
FIG. 3 is a schematic diagram showing a beacon frame.

The timer circuit 212 manages the TSF timer value based on the high-speed clock. In this embodiment, the TSF timer value is counted by using the low-speed clock, when the 40-MHz high-speed clock 224 is suspended. The timer circuit 212 can be formed in the base band operation circuit 206, or can be formed with the base band operation circuit 206 on a substrate. The TSF timer value which is set in the timer circuit 212 is included in the beacon signal which is transmitted from the access point. A structure of a beacon frame 300 is shown in FIG. 3. The beacon frame 300 includes a MAC header, a frame body, and a FCS. The MAC header includes a frame controlling field, a time/ID field, a destination address field, a BSSID field, and a sequence controlling field. The frame body includes a time stump field, a beacon interval field, a capability field, and a SSID field, etc.

A structure of the timer circuit 212 is shown in FIG. 1. The 40-MHz high-speed clock 224 is supplied to a 1/40 counter 100, a TSF timer 102, and a clock selecting circuit 104. The clock selecting circuit 104 has normally input thereto the 32.768-kHz low-speed clock 226. The low-speed clock 226 is used as a real time clock in the wireless LAN device 200.

The 1/40 counter 100 has input thereto the 40-MHz high-speed clock 224 and output a timing signal 106 every 40 clocks. The timing signal 106 is input to the TSF timer 102 as a 1-MHz reference clock. The TSF timer value is managed by the 1/40 counter 100 and the TSF timer 102, during the normal operation. The 1/40 counter 100 is connected to a register 110, and outputs a 1/40 counted value 114 to a selector 116 in response to an inputting of a register value which is stored in the register 110. The selector 116 has input thereto the 1/40 counted value 114 and an output 118 from an adder 120.

A selector 122 selects a value "21" at a ratio of 7/10 and a value "20" at a ratio of 3/10 in response to the leading edge of the low-speed clock 226 and outputs the selected value 124 to the adder 120. The ratio of the 7/10 and the ratio of the 3/10 are set by a 7/10 ratio circuit 130.

The adder has two input terminals which are connected to the output terminal of the register 110 and an output terminal of the selector 122, and has an output terminal which is connected to the selector 116. The adder has input therein the selected value 124 from the selector 122 and the output 112 of the register 110, and outputs an added value 118. The register 110 stores the counted value 114 and the added value 118 alternatively in response to an input clock 140. If the register 110 is driven by the 40-MHz high-speed clock 224, the 1/40 counted value is set as an initial value and stores the counted value 114 and the added value 118 alternatively in response to a leading edge of the low-speed clock 226. A carry 134 from the adder 120 is transferred to an adder 150. The clock selecting circuit 104 generates a 32.768-kHz low-speed clock 140 which is synchronized with the 40-MHz high-speed clock and outputs the generated 32.768-kHz low-speed clock 140 to the register 110 and the register 142, when the high-speed clock 224 and the low-speed clock 226 are input in the clock selecting circuit 104.

The adder 150 adds a value "30" to an output value 152 of the register 142 in response to the carry 134. An added result 154 of the adder 150 is output to a selector 156. The selector 154 has input thereto the added result 154 and an output 108 from the TSF timer 102. The register 142 stores an output of the selector 156 in synchronization with the clock 140, and outputs an output value 152. The register 142 stores the TSF timer value 108 in response to the leading edge of the low-speed clock 226, when the wireless LAN device 200 is driven by the 40-MHz high-speed clock.

The TSF timer 102 counts in synchronized with the 1-MHz timing signal 106. When the high-speed clock is suspended, the TSF timer 102 counts a buck up counter value (B_TSF value). The TSF timer 102 outputs the counted value as the timer value 108.

Now, a method of updating and compensating the TSF timer value by using the low-speed clock 226 with the high-speed clock 224 is described below. Generally, the high-speed clock 224 and the low-speed clock 226 satisfy following conditions. First, high-speed clock 224 suspends in synchronization with the timing of the high-speed clock 224 itself. Second, the high-speed clock 224 is restarted in synchronization with the leading edge of the low-speed clock 226 after the suspending. Third, the high-speed clock 224 is not synchronized with the low-speed clock 226. Fourth, the high-speed clock 224 and the low-speed clock 226 have high accuracy.

A cycle $T_{40M}$ of the high-speed clock 224 is 0.025 μs and a cycle $T_{32k}$ of the low-speed clock 226 is 30.51757 μs. Therefore, a cycle of the low-speed clock 226 includes 30.51757/0.025=1220.7028 cycles of the high-speed clock 224. Accordingly, a second decimal place of the value 1220.7028 is zero, the value 1220.7028 can be approximated by a value 1220.7. The value 1220.7 is counted by separating a value 20.7 and a value 1200 in this embodiment.

While the high-speed clock 224 is suspended, the adder 120 adds the value "21 at the ratio of 7/10 and the value "20" at the ratio of 3/10 to a back up counter value B_C40. The adder 150 adds the value "30" to the back up counter value B_TSF. If the carry is generated in the adder 120, the adder 150 adds the value "30" to the back up counter value B_TSF.

Figure 4:
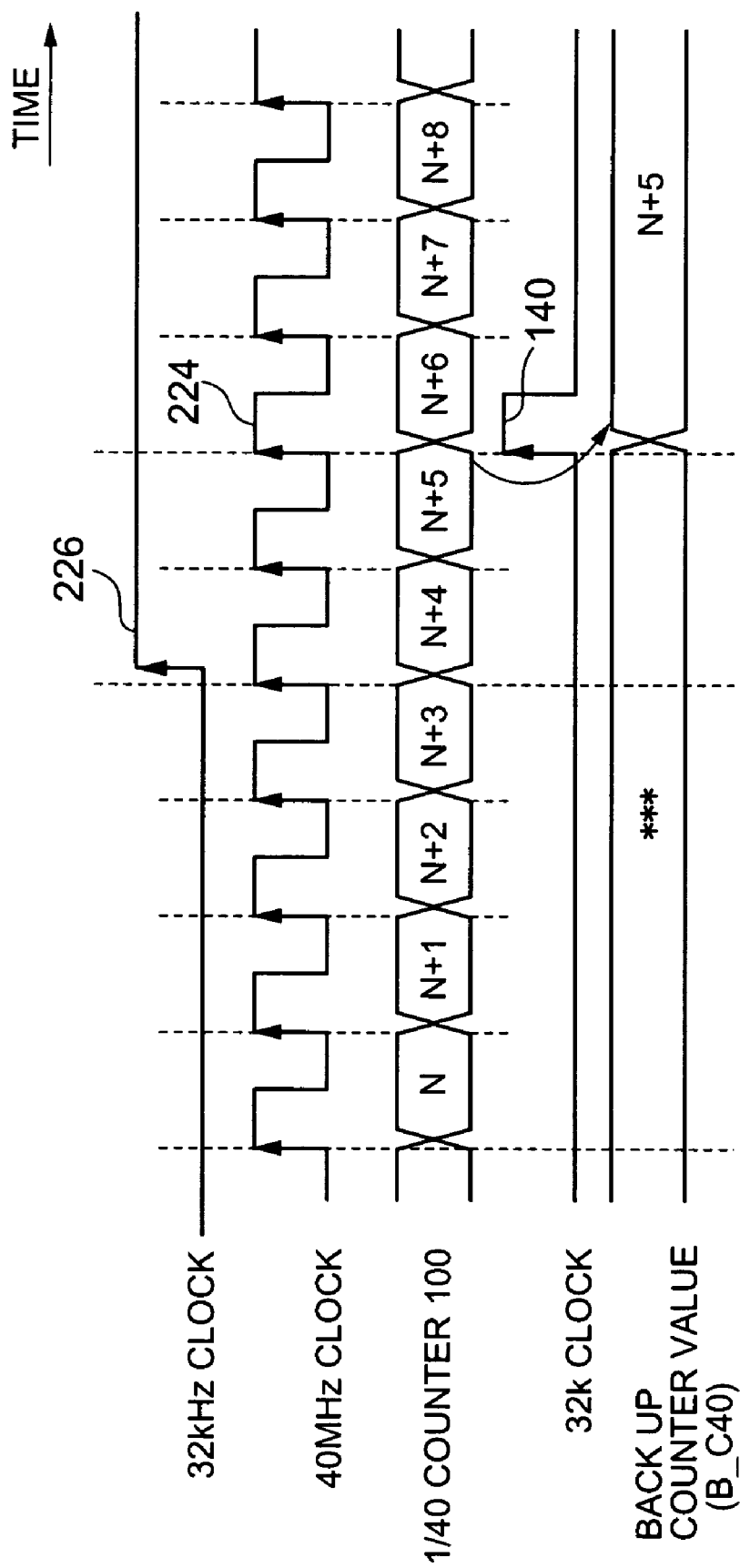
FIG. 4 is a timing chart at 40-MHz high-speed clock is supplied.
Figure 5:
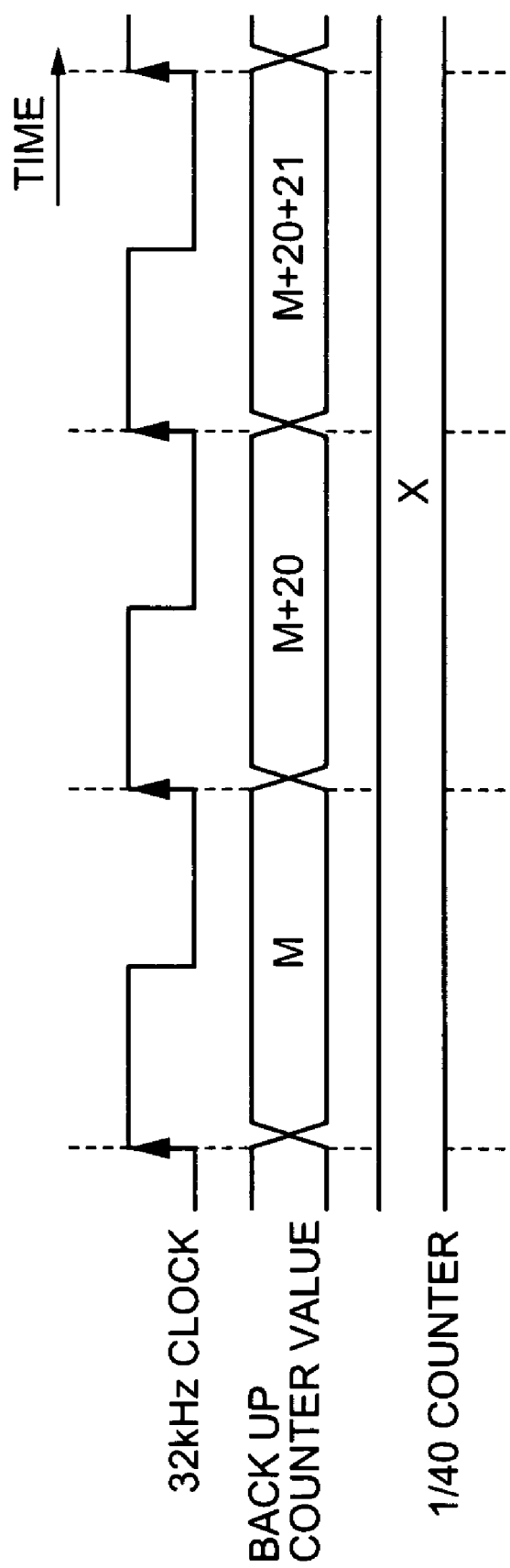
FIG. 5 is a timing chart at 40-MHz high-speed clock is suspended.
Figure 6:
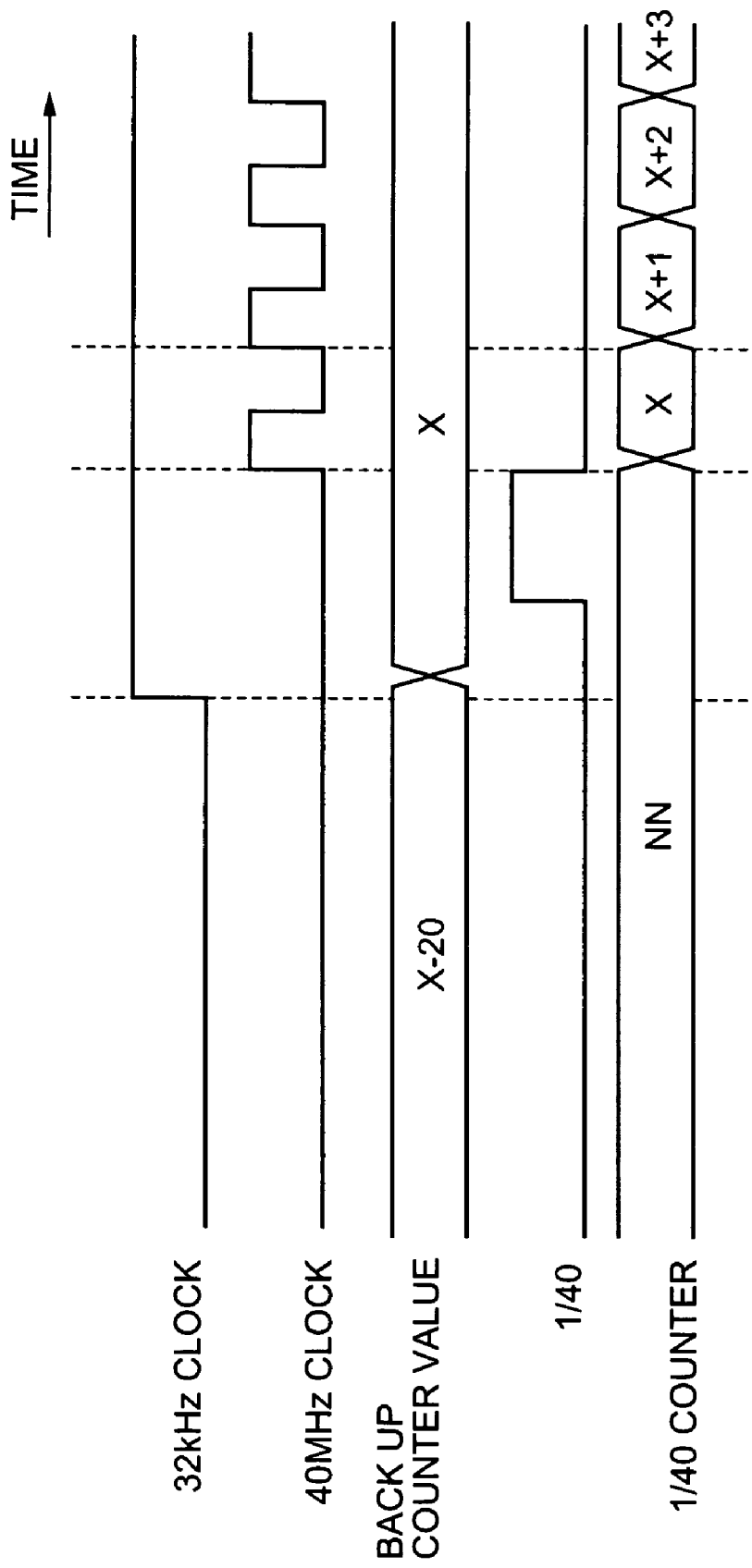
FIG. 6 is a timing chart at 40-MHz high-speed clock is restarted.

Next, a suspending operation is described by referring to FIGS. 4 to 6. First, while a continuation operation that the high-speed clock 224 is supplied, the counted value in the 1/40 counter 100 and the TSF timer value in the TSF timer are stored in the registers 110 and 142 respectively, in response to a leading edge of the low-speed clock 140 as shown in FIG. 4. The back up counter value which is stored in the register 110 is B_C40, and the back up counter value which is stored in the register 142 is B_TSF. The storing operation is synchronized with the low-speed clock 226. Therefore, the storing operation does not need a large amount of power consumption. The low-speed clock 140 is delayed from the low-speed clock 226 for synchronizing with the high-speed clock 224. However, the delay is not necessary.

In the high-speed clock operation, the 1/40 counter value and the TSF counter value are stored in the registers 110 and 142 respectively in response to the leading edge of the low-speed clock 226 before the high-speed clock 224 is suspended. The storing operation is performed one time before the high-speed clock 224 is suspended.

While the high-speed clock 224 is suspended, the counting operation of the high-speed clock 224 at the 1/40 counter 100 is suspended as shown in FIG. 5. While the high-speed clock 224 is suspended, the adder 120 adds the value "21" to the B_C40 at the ratio of 7/10 and adds the value "20" to the B_C40 at the ratio of 3/10, in response to the leading edge of the low-speed clock 226. Also, the adder 150 adds the value "30" to the B_TSF in response to the leading edge of the low-speed clock 226. If the register value B_C40 has the carry, the adder 150 add the value "31" to the B_TSF in response to the leading edge of the low-speed clock 226.

Then, the high-speed clock 224 is restarted in synchronization with the low-speed clock 226. The B_C40 is transferred to the 1/40 counter 100 and the B_TSF is transferred to the TSF timer 102 as shown in FIG. 6. Then, the suspended operation is finished, and the 1/40 counter starts counting the high-speed clock 224 and the TSF timer 102 starts counting the TSF timer value. As a result, a consistency of the TSF timer value is ensured.

Now, an error of the TSF timer value after the suspending operation from the TSF timer value which is supplied the high-speed clock continuously, is considered. The error is generated by approximating the 40000000-Hz/32768-Hz=1220.703125 by the value 1220.7. Therefore, the error is $-3.125e^{-3}/1220.703125 = 2.56e^{-6}$. If the standard beacon interval is 100-msec in the wireless LAN standard, the error is within the allowable limit.

While the preferred form of the present invention has been described, it is to be understood that modifications will be apparent to those skilled in the art without departing from the spirit of the invention. The scope of the invention is to be determined solely by the following claims.

What is claimed is:

1. A local timer, comprising:
a first input circuit which has input thereto a first clock;
a dividing counter which counts the first clock and outputs a reference counting signal, wherein a frequency of the reference counting signal is divided from the first clock;
a timing synchronizing timer which counts a timing synchronizing timer value in synchronization with a reference timer in an access point, in response to the reference counting signal;
a second input circuit which has input thereto a second clock, wherein a frequency of the second clock is less than a frequency of the first clock;
a first buffer which stores a counted value of the dividing counter in synchronization with the second clock, when operation is in accordance with the first clock;
a second buffer which stores the timing synchronizing timer value in synchronization with the second clock, when operation is in accordance with the first clock;
a first adder which adds a first offset value or a second offset value to the counted value stored in the first buffer in synchronization with the second clock, when the first clock is suspended, wherein the first offset value and the second offset value are selected by a set ratio; and
a second adder which adds a set value to the stored timing synchronizing timer value in response to a carry from the first adder, wherein the set value is set based on a ratio between the first clock and the second clock,
wherein the first buffer sets therein the counted value to the output of the dividing counter in synchronization with the second clock, after the first clock is restarted, and
wherein the second buffer sets therein the timing synchronizing timer value in synchronization with the second clock, after the first clock is restarted.

2. The local timer of claim 1, wherein the first buffer stores the counted value in synchronization with the second clock before the first clock is suspended, and wherein the second buffer stores the timing synchronizing timer value in synchronization with the second clock before the first clock is suspended.

3. The local timer of claim 2, wherein the second buffer is normally in synchronization with the second clock.

4. The local timer of claim 1, wherein a frequency of the first clock is 40-MHz and a frequency of the second clock is 32.768-kHz.

5. The local timer of claim 4, wherein the first adder adds a value of "21" as the first offset value at a ratio of 7/10 to the counted value, and a value of "20" as the second offset value at a ratio of 3/10 to the counted value, and wherein the second adder adds a value of "30" as the set value to the timing synchronizing timer value.

* * * * *